(12) United States Patent
Kubiak et al.

(10) Patent No.: US 7,906,751 B2
(45) Date of Patent: Mar. 15, 2011

(54) SOLAR SENSOR INCLUDING FIRST AND ADDITIONAL MODULATORS

(75) Inventors: Michael Kubiak, Berlin (DE); Oliver Bard, Falkensee (DE); Gerald Kloiber, Feldkirchen (AT); Gero Zimmermann, Berlin (DE); Peter Balzer, Berlin (DE)

(73) Assignee: EPCOS AG, Munich (DE)

( * ) Notice: Subject to any disclaimer, the term of this patent is extended or adjusted under 35 U.S.C. 154(b) by 17 days.

(21) Appl. No.: 12/367,937

(22) Filed: Feb. 9, 2009

(65) Prior Publication Data

US 2009/0184232 A1    Jul. 23, 2009

Related U.S. Application Data

(63) Continuation of application No. PCT/DE2007/001359, filed on Jul. 30, 2007.

(30) Foreign Application Priority Data

Aug. 17, 2006  (DE) .......................... 10 2006 038 497

(51) Int. Cl.
*G01C 21/02* (2006.01)
*G01C 21/24* (2006.01)
*G01J 1/20* (2006.01)

(52) U.S. Cl. ........................... 250/203.4; 126/573; 353/3

(58) Field of Classification Search ............... 250/203.4, 250/216, 208.2, 203.3, 203.6; 126/573; 353/3
See application file for complete search history.

(56) References Cited

U.S. PATENT DOCUMENTS

| | | | |
|---|---|---|---|
| 4,933,550 A | 6/1990 | Hegyi | |
| 5,181,654 A | 1/1993 | Yoshimi et al. | |
| 6,417,500 B1 | 7/2002 | Wood | |
| 6,781,106 B2 * | 8/2004 | Sumiya | 250/203.4 |
| 2002/0024000 A1 | 2/2002 | Tsukamoto | |
| 2002/0047085 A1 | 4/2002 | Sumiya | |
| 2004/0145802 A1 * | 7/2004 | Miniutti et al. | 359/356 |
| 2005/0068785 A1 * | 3/2005 | Takeda et al. | 362/506 |
| 2006/0083509 A1 * | 4/2006 | Shimo | 396/268 |
| 2007/0108900 A1 * | 5/2007 | Boek et al. | 313/506 |
| 2008/0135726 A1 | 6/2008 | Balzer et al. | |

FOREIGN PATENT DOCUMENTS

| | | |
|---|---|---|
| DE | 38 21 743 A1 | 1/1990 |
| DE | 689 10 025 T2 | 3/1994 |
| DE | 698 04 110 T2 | 11/2002 |
| DE | 10 2004 009 172 A1 | 9/2005 |
| EP | 0 350 866 B1 | 1/1990 |
| WO | WO 94/23277 | 10/1994 |
| WO | WO 99/13359 | 3/1999 |

* cited by examiner

*Primary Examiner* — Georgia Y Epps
*Assistant Examiner* — Francis M Legasse, Jr.
(74) *Attorney, Agent, or Firm* — Slater & Matsil, L.L.P.

(57) ABSTRACT

The invention pertains to a solar sensor that includes a first modulator that is transparent to electromagnetic waves within a spectrum, and an additional modulator that is at best slightly transparent to the electromagnetic waves within the spectrum. The additional modulator features a belt-shaped region of varying widths that is arranged on the outside of the first modulator and partially covers the first modulator, and a photodetector that receives the electromagnetic waves and is covered by the first modulator.

20 Claims, 6 Drawing Sheets

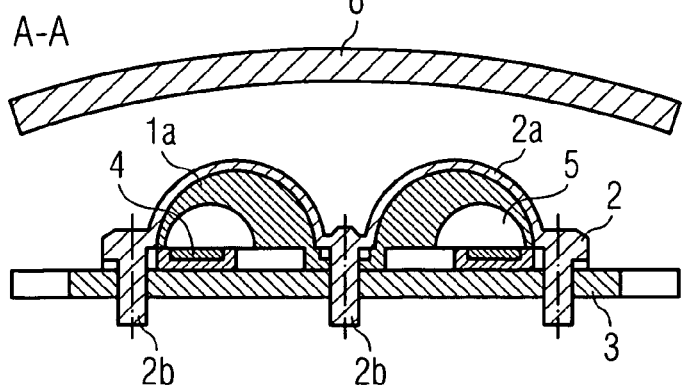
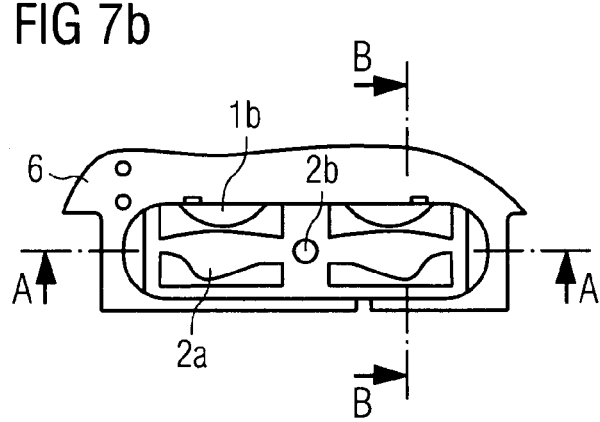
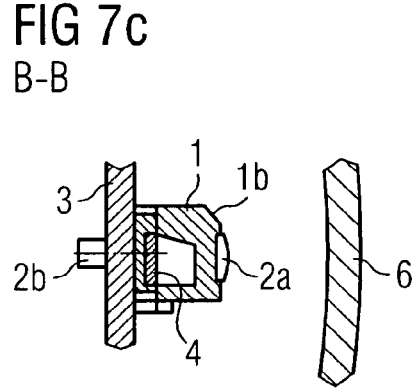
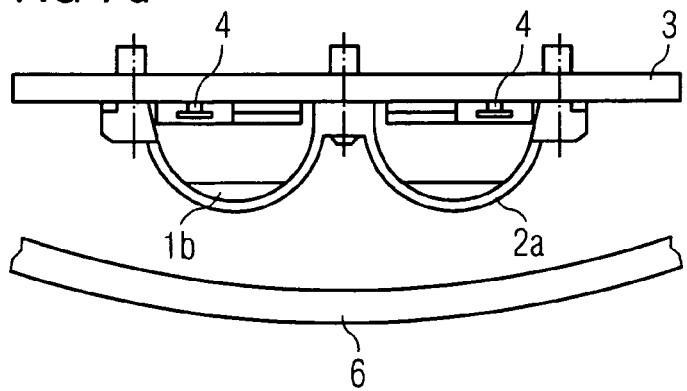

SOLAR SENSOR INCLUDING FIRST AND ADDITIONAL MODULATORS

This application is a continuation of co-pending International Application No. PCT/DE2007/001359, filed Jul. 30, 2007, which designated the United States and was not published in English, and which claims priority to German Application No. 10 2006 038 497.0 filed Aug. 17, 2006, both of which applications are incorporated herein by reference.

TECHNICAL FIELD

The invention pertains generally to a solar sensor and in particular embodiments to a solar sensor suitable for outputting an electric signal, depending on the position of the sun relative to the solar sensor.

BACKGROUND

A sensor for measuring the solar radiation in a passenger compartment of a motor vehicle is known from DE 38 21 743 A1.

SUMMARY

In one embodiment, a sensor that makes it possible to precisely determine the angle of incident electromagnetic waves is disclosed.

A solar sensor that features a first modulator that is transparent to electromagnetic waves within a spectrum and an additional modulator that is, at best, slightly transparent to the electromagnetic waves within the spectrum is disclosed. A section of the additional modulator is realized in a belt-shaped fashion with different widths. The additional modulator is arranged on the outside of the first modulator and partially covers the first modulator.

The solar sensor furthermore features a photodetector that receives the electromagnetic waves and is at least partially covered by the first modulator.

A modulator is a body that modulates the incident electromagnetic waves due to its geometric and/or material properties. In this case, the electromagnetic waves can be at least partially absorbed, scattered or refracted.

The interaction between the first and the additional modulator makes it possible to influence the electromagnetic waves in such a way that their signal curve generated by the photodetector provides information on the angle of incidence of the electromagnetic waves. The calculation of the angles of incidence is carried out with an evaluation unit that comprises an evaluation program. This evaluation unit makes it possible, for example, to calculate an azimuth angle and an elevation angle referred to the position of the source of the electromagnetic waves.

The photodetector converts the energy of the incident electromagnetic waves into electrical and/or optical output signals that can be read by the evaluation unit.

The solar sensor is preferably used for controlling an air-conditioning system, for example, in a building or in a mobile unit such as, for example, a motor vehicle or an aircraft.

A section of the belt-shaped region of the additional modulator that is wider than other sections of the belt-shaped region prevents or reduces the incidence on the photodetector of electromagnetic waves with an intensity that is higher than a certain value or value range within a certain spectrum. Consequently, an overmodulation of the photodetector can be prevented, particularly when the sun is positioned high in the sky or the solar radiation is incident on the photodetector in a range that contains its maximum intensity.

A section of the belt-shaped region of the additional modulator that is narrower than other sections of the belt-shaped region decreases the blocking of attenuated electromagnetic waves with flatter angles of incidence and angles of incidence other than the vertical such that the output signal voltage of the photodetector can be correspondingly increased.

The combination of information on the shape of the additional modulator and on the electromagnetic energy incident on the photodetector therefore makes it possible to determine the arrangement of the sun relative to the photodetector. The shape of the additional modulator and the relative positions of greater or smaller widths of the belt-shaped region of the modulator can be based on empirical information obtained from simulations or experiments.

According to one embodiment of the solar sensor, the first modulator features at least one dome-shaped region, under which the photodetector is preferably arranged.

The first modulator preferably features an angled polish cut that refracts the incident electromagnetic waves in the direction of the photodetector. In this case, it is advantageous that the angled polish cut not be covered by the additional modulator such that the incident electromagnetic waves can penetrate into the first modulator in an unhindered fashion.

It is preferred that the first modulator be realized in the form of a prism. In this case, the first modulator may feature an angled polish cut.

According to one embodiment, the prism is realized with several angled polish cuts that respectively refract the incident electromagnetic waves in a desired direction, particularly on the photodetector.

The additional modulator may be realized in the form of a mechanical holding device for the first modulator.

According to one embodiment of the solar sensor, the additional modulator is realized in the form of a prism holder that serves as a mount for the first modulator realized in the form of a prism.

In a mobile unit such as, for example, in a motor vehicle, the first modulator realized in the form of a prism with an angled polish cut is preferably arranged in such a way that the surface of the angled polish cut is directed toward the driving direction of the motor vehicle. The angled polish cut has an inclination and a surface that guide the electromagnetic waves incident through the window of the vehicle on the photodetector. Heat generated due to infrared waves therefore can be compensated for the comfort of the driver or front seat passenger by way of a dependable control of the air-conditioning system. This makes it possible to achieve an improved sensitivity of the solar sensor to frontal irradiation.

It is preferred that the first and/or the second modulator be realized in one piece. In this case, they may comprise a single material casting. This provides the advantages of a simplified manufacture and of a largely homogeneous material distribution that influences the modulation of the incident electromagnetic waves.

According to one embodiment, the solar sensor features two dome-shaped regions that respectively cover a photodetector.

The dome-shaped region of the first modulator that is arranged on the left side relative to a reference axis such as, for example, to the left of the axis of motion of a vehicle, refracts the incident electromagnetic waves differently than a dome-shaped region situated on the right side of the reference axis. Consequently, the output signals of the photodetectors situated underneath the dome-shaped regions differ such that it is possible to distinguish between electromagnetic waves that are incident from the right and from the left. The signals originating from the photodetectors are evaluated in an evaluation unit such that, for example, an air-conditioning system can react to the heat incident from the right or from the left. A solar sensor of this type that distinguishes between light incident from the left and light incident from the right may also be referred to as a two-zone solar sensor or dual solar sensor.

The solar sensor preferably features a connection piece, through which a mounting means can be inserted, adjacent to a dome-shaped region of the first modulator. For this purpose, the connection piece may be realized with a hole. Suitable mounting means are, for example, screws or pins that fix the solar sensor on a mounting plate such as, for example, a printed circuit board that may optionally be provided with electric components. The additional modulator may also be realized with such mounting means.

The additional modulator preferably also has a shape such that it can be arranged on the outside of the first modulator in a form-fitting fashion. A simple assembly and a compact installation of the solar sensor can be achieved in this fashion. For example, the additional modulator could be pushed over the first modulator. If the mounting means are arranged at suitable locations of the two modulators such as, for example, on projections, a secure connection between the additional modulator and the first modulator can be produced, and an overall secure mounting of the solar sensor on a mounting plate can be achieved.

According to one embodiment of the solar sensor, the additional modulator features at least one bent bow that serves as the belt-shaped region of different widths and is adapted to the outside contour of the first modulator that lies under the additional modulator, particularly to its dome-shaped regions.

It is particularly preferred that the additional modulator feature a belt-shaped region that is realized wider in the upper, dome-shaped region of the first modulator than in the regions of the first modulator that are situated closer to the mounting plate. Due to this measure, electromagnetic waves with relatively flat angles of incidence referred to the vertical of the photodetector are blocked to a lesser extent by the additional modulator and therefore can reach the photodetector more easily. Attenuated electromagnetic waves with relatively low intensity that originate from the sun positioned near the horizon therefore can be reliably detected.

The additional modulator may feature a frame that encompasses the contour of the first modulator. For example, the additional modulator could have the shape of an E, in the recesses of which a dome-shaped region of the first modulator is respectively arranged. In this case, a belt-shaped region of the additional modulator connects the two opposing webs of the E-shaped first modulator. The E-shape provides the advantage that the first modulator is not encompassed by the additional modulator on the side of the openings of the E-shape. Consequently, the electromagnetic waves can be incident into the solar sensor from this side without obstruction. The first modulator preferably features an angled polish cut on this side. Consequently, the transmission of electromagnetic waves from the region of the angled polish cut to the photodetector can be improved by means of suitable refraction.

Adding to another embodiment of the solar sensor, the first modulator contains a translucent material. Due to this measure, the signal curve of the electromagnetic waves incident on the photodetector can be smoothed out because the translucent material scatters electromagnetic waves. This provides the advantage of reducing any artifacts in the output signals of the photodetector such that the reliability of the output signals originating from the photodetector is improved.

The translucent material preferably comprises a polycarbonate. The translucent material may have a character such that the inner workings of the solar sensor, i.e., the structures situated underneath the first modulator, are not optically revealed. It would be possible, in particular, to use materials for the first modulator that are transparent to infrared radiation such that it can reach the photodetector in an unhindered or nearly unhindered fashion. In addition, it is advantageous if the first modulator consists of a material that absorbs optical light, i.e., visible light.

According to one embodiment of the solar sensor, the first modulator and the second modulator are surrounded by a covering cap that is transparent to the same electromagnetic waves as the first modulator. In this case, the covering cap could have a certain surface roughness, for example, on its side that faces the modulators and/or on its outside. The covering cap is preferably adapted to the shape of a dashboard of a vehicle, into which the solar sensor could be installed. In this case, it could follow the actual contour of the dashboard or have the same color or the same surface structure.

The scattering and the smoothing of the intensity of the incident electromagnetic waves can be improved by selecting the position of the increased surface roughness accordingly. Consequently, the reception characteristic of the solar sensor can be effectively manipulated with the aid of the covering cap.

BRIEF DESCRIPTION OF THE DRAWINGS

The features are elucidated in greater detail below with reference to the attached drawings and the embodiments illustrated therein. In these drawings:

FIG. 7a shows a section through a two-zone solar sensor with a covering cap;

FIG. 7b shows a sectioned top view of a two-zone solar sensor with a covering cap;

FIG. 7c shows a sectioned side view of a two-zone solar sensor with a covering cap;

FIG. 7d shows another section through a two-zone solar sensor with a covering cap;

Figure 1:
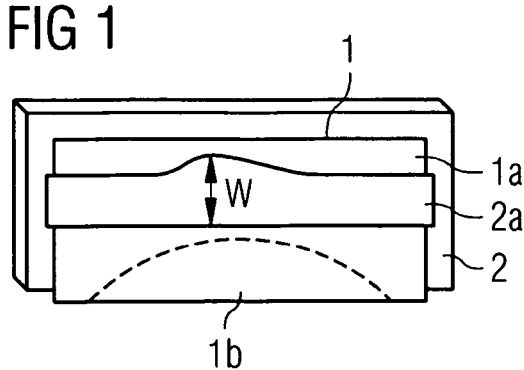
FIG. 1 shows a top view of a single-zone solar sensor.

The following list of reference symbols can be used in conjunction with the drawings:

1 First modulator
1a Dome-shaped region of first modulator
1b Angled polish cut region of first modulator
1c Projection of first modulator
1d Mounting hole
2 Second modulator
2a Belt-shaped region of second modulator
2b Mounting pin of second modulator
2c Frame-shaped region of second modulator
3 Mounting surface
4 Photodetector
5 Cavity
6 Covering cap
7 Sun
8 Solar sensor

DETAILED DESCRIPTION

FIG. 1 shows a single-zone solar sensor with a one-piece first modulator 1 that is transparent to electromagnetic waves within a spectrum and an additional one-piece modulator 2 that partially covers the first modulator. The additional modulator respectively comprises or is manufactured of a dark, preferably black plastic. The first modulator 1 features a dome-shaped region 1a and an angled polish cut 1b. A belt-shaped region 2a of the additional modulator 2 is arranged around the continuously curved or dome-shaped region 1a of the first modulator. The additional modulator 2 comprises a frame that is open on one side, into which the first modulator 1 is inserted. Between two opposing arms of the frame, a belt-shaped region 2a of the additional modulator extends around the first modulator like a bow, preferably in a form-fitting or at least nearly form-fitting fashion. The frame and the belt-shaped or bow-shaped region of the additional modulator preferably consist of a single material casting. The additional modulator 2 may comprise a plastic. It may be realized, in particular, in a slightly elastic fashion such that it can be snapped onto the first modulator and secured from shifting.

The single-zone solar sensor features a photodetector that is covered by the modulators 1 and 2, therefore not visible in this figure. The photodetector is preferably sensitive to radiation in the infrared range of the electromagnetic spectrum. In this case, the first modulator 1 is transparent to electromagnetic waves in this spectrum while the additional modulator is not or at least is only slightly transparent to these electromagnetic waves.

The belt region of the additional modulator 2 has a greatly varying width w. Due to this measure, electromagnetic waves are selectively incident on the photodetector with different intensities from different directions. For example, if electromagnetic waves are incident on the single-zone solar sensor from a vertical direction referred to the photodetector surface, they would be blocked to a greater extent by a relatively wide section of the modulator belt 2a. Overloading of the photodetector therefore can be prevented. However, the sensitivity of the single-zone solar sensor to electromagnetic waves that are incident at a flat angle referred to the aforementioned vertical is simultaneously increased because the belt 2a is realized narrower in the regions of the additional modulator 2 that lie closer to the bottom of the single-zone solar sensor. In the figure, such electromagnetic waves that are incident onto the photodetector at a relatively flat angle are also referred to as being incident from the right or the left.

The angled polish cut 1b of the first modulator 1 preferably comprises a surface that faces away from the opening of the frame and through which the electromagnetic waves can penetrate into the first modulator 1 from the additional modulator 2 in an unhindered fashion. The angled polish cut 1b serves for increasing the sensitivity of the solar sensor to electromagnetic waves that, referred to the driving direction of a vehicle into which the solar sensor could be installed, are incident from the front, particularly at a sun elevation of approximately 50° above the horizon. The sensitivity is heightened due to the fact that the angled polish cut 1b directly guides the electromagnetic waves incident from the front onto the photodetector, namely without having to diffract these waves. Consequently, it is possible to reliably detect solar heat that is incident into the passenger compartment from the front, which usually leads to a rapid temperature increase in the passenger compartment, particularly in the region of the driver and the front seat passenger. The output signals of the solar sensor characteristic for this irradiation accordingly control the air-conditioning system in such a way that a fast cooling effect is achieved to improve the comfort of the vehicle occupants.

Due to its sensitivity in the infrared range of the electromagnetic spectrum, the single-zone solar sensor is suitable for detecting incident solar heat regardless of the angle of incidence of the solar radiation and therefore can be used for controlling an air-conditioning system of a mobile unit such as, for example, a motor vehicle, a rail vehicle or an aircraft.

Figure 2:
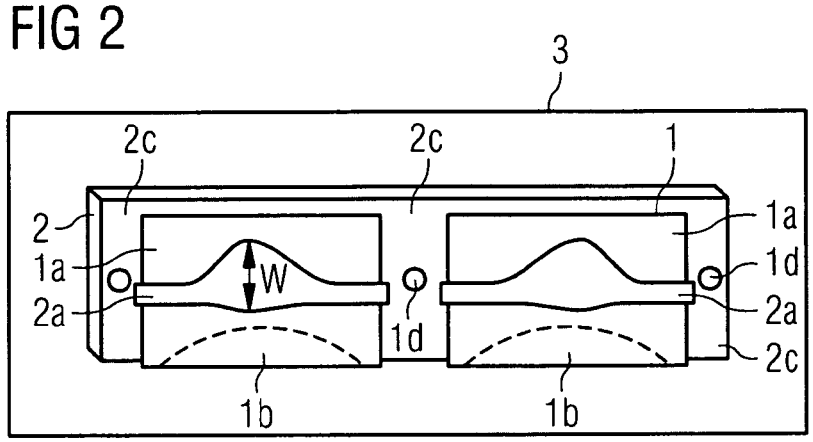
FIG. 2 shows a top view of a two-zone solar sensor.

FIG. 2 shows a two-zone solar sensor arranged on a mounting plate 3 and essentially comprises two adjacently arranged single-zone solar sensors according to FIG. 1 and the corresponding parts of the description. In this case, the one-piece first modulator 1 is realized with two dome-shaped regions 1a that respectively feature an angled polish cut 1b. The additional one-piece modulator 2 features two belt-shaped regions 2a that are arranged around the dome-shaped regions 1a of the first modulator 1. According to the orientation merely illustrated in an exemplary fashion in the figure, the additional modulator 2 has the shape of a tilted E, into the two openings of which the dome-shaped regions 1a of the first modulator are inserted. The central arm or web of the E-shape is connected to the belt-shaped regions 2a of the additional modulator 2 that are bent around the first modulator 1. The arms of the E-shaped frame of the additional modulator 2 may contain ducts 1d, through which mounting means such as screws or grooves can be guided to securely connect the two-zone solar sensor to a mounting plate 3 such as, for example, a printed circuit board.

A photodetector that is not visible in this figure is situated underneath each dome-shaped region 1a of the first modulator.

The two-zone solar sensor with its photodetectors that lie to the right and to the left of a reference axis is able to at least detect irradiations of electromagnetic waves that are offset relative to one another by 180°. This has the advantage that a two-zone solar sensor installed in a mobile unit with changing orientation is able to carry out reliable measurements of the electromagnetic energy incident into the means such as, for example, solar radiation.

Figure 3:
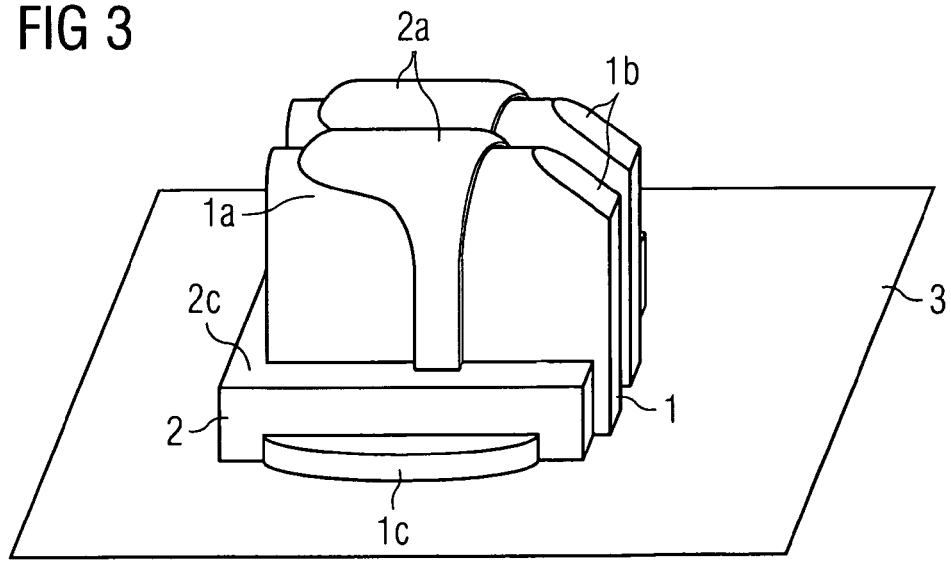
FIG. 3 shows a side view of a two-zone solar sensor.

FIG. 3 shows a perspective side view of the two-zone solar sensor described with reference to FIG. 2. This figure shows a first modulator 1 with several dome-shaped regions 1a, wherein a carrier part 2c of the additional modulator 2 is arranged adjacent to a dome-shaped region. A carrier part 2c of the additional modulator 2 realized in the form of a frame preferably lies at least partially on a projection 1c of the first modulator 1 arranged adjacent to the dome-shaped region 1a. If the additional modulator 2 is pushed on the first modulator 1, the carrier part 2c presses on the projection 1c such that the first modulator 1 can be pressed on a mounting plate, if applicable, by utilizing mounting means.

This figure also shows angled polish cuts 1b of the first modulator 1 that face away from the openings of the E-shaped frame of the additional modulator 2.

Figure 4:
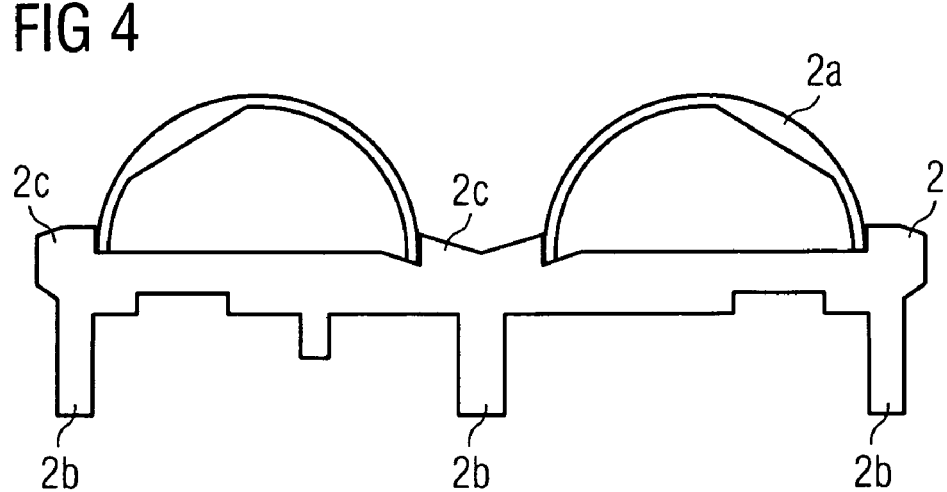
FIG. 4 shows a side view of a modulator with covering function for a two-zone solar sensor.

FIG. 4 shows a side view of the additional modulator 2 and its two bows 2a that are realized with different widths. This figure also shows a carrier part 2c in the form of a bridge that connects the bows to one another. Carrier parts 2c that form part of the frame are also arranged adjacent to the bows on the outside. The outside contour of the underside, i.e., the side of the additional modulator 2 subsequently directed toward a mounting surface is preferably adapted to the corresponding outside contour of the first modulator in such a way that the additional modulator 2 lies on the first modulator 1 in a form-fitting fashion.

On its underside, the additional modulator 2 features several perpendicular rods or pins 2b that can be inserted into corresponding holes of the first modulator 1 and, if applicable, of the mounting plate 3.

Figure 5:
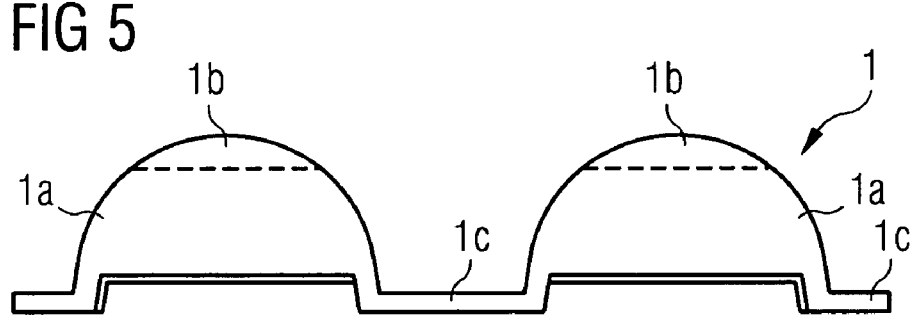
FIG. 5 shows a side view of a transparent modulator for a two-zone solar sensor.

FIG. 5 shows a first modulator 1 in the form of two domes 1a connected to one another by means of a bridge 1c. Each dome 1a features an angled polish cut 1b in this case. The dome or dome-shaped regions 1a of the first modulator 1 would respectively cover a photodetector such as, for example, a photodiode.

Figure 6:
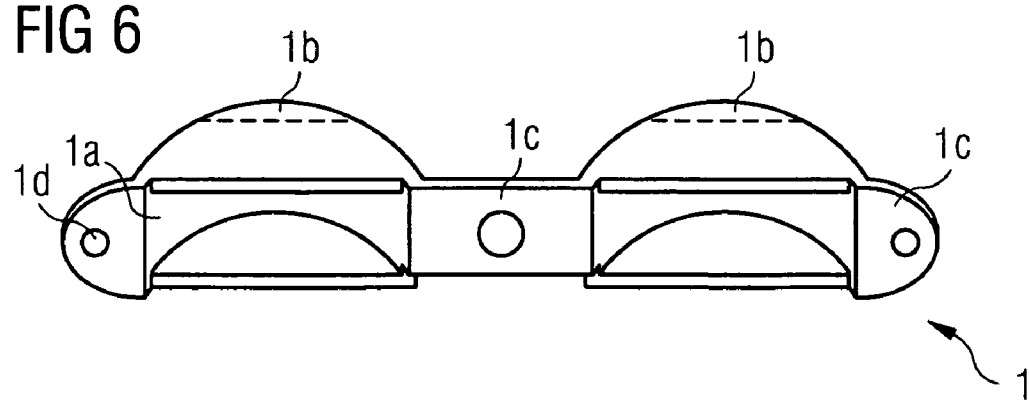
FIG. 6 shows a perspective representation of a transparent modulator for a two-zone solar sensor.

FIG. 6 shows a perspective representation of the underside of the first modulator 1 and the cavity within each dome 1a, as well as holes 1d that are arranged in the bridges 1c adjacent to the domes 1a to accommodate mounting means such as, for example, the pins 2b of the additional modulator 2 illustrated in FIG. 4 or screws. Viewed from the underside of the first modulator 1, the angled polish cut regions 1b may also be referred to as roof slopes that interrupt the round inner wall of the domes 1a by means of a flat region.

FIGS. 7a-7d, collectively FIG. 7, show different technical sections through a two-zone solar sensor, wherein the different views are turned relative to one another. With respect to the actual installation position of the solar sensor, for example, in a dashboard of a motor vehicle, these views have no relevance and merely serve for elucidating the construction or inner workings of the solar sensor.

FIG. 7a shows a section through a two-zone solar sensor arrangement, in which a two-zone solar sensor is surrounded by a hood or covering cap 6. The covering cap 6 can be adapted to the shape of an object into which the solar sensor is installed, e.g., a dashboard. It is preferably transparent to the same electromagnetic waves as the first modulator 1, e.g., infrared radiation. It also has the function of protecting the two-zone solar sensor from external influences such as, e.g., dust, dirt or moisture. In this case, the covering cap may form part of a housing of the solar sensor. According to one embodiment of the covering cap 6, its inner side could have a certain surface roughness adapted to the photodetector output signal characteristic required by a customer. The surface roughness could serve, for example, for damping the intensity peaks of incident electromagnetic waves.

The sectional representation shows the aforementioned photodetectors 4 that are respectively offset relative to the reference axis and arranged underneath a dome 1a. This figure also shows cavities 5 arranged between each photodetector 4 and the ceiling of each dome 1a and filled with air or another material, to which the photodetectors are insensitive.

If viewed in the form of a perspective representation, the cavities have a semi-cylindrical shape.

FIG. 7b shows a sectioned top view of the two-zone solar sensor. In this case, the covering cap 6 is provided with a recess to illustrate the inner workings of the sensor. The one-piece additional modulator 2 with its belt-shaped regions or bows 2a is illustrated in the form of a negative image underneath the covering cap 6. The beveled regions 1b of the dome 1a of the first modulator 1 are illustrated adjacent to the bows 2a. A section of a mounting means 2b such as, for example, a rod or a screw is shown in the center between the domes 1a.

FIG. 7c shows a sectioned side view of the two-zone solar sensor from the perspective B-B. This figure shows a section through the upper belt-shaped region 2a of the additional modulator, as well as a section through the cavity 5.

FIG. 7d shows a section through the solar sensor according to FIG. 7a, wherein the solar sensor is, however, turned such that this figure shows the rear side of the solar sensor not visible in FIG. 7a. This section shows the front side of the solar sensor referred to the driving direction of a vehicle into which the solar sensor could be installed. This figure shows other sides of the photodetectors 4 on which soldering points or soldering pads are illustrated underneath the photodetectors. Due to the sectional representation of the front side of the solar sensor, the angled polish cut regions 1b of the first modulator 1 are also visible in this figure.

Figure 8:
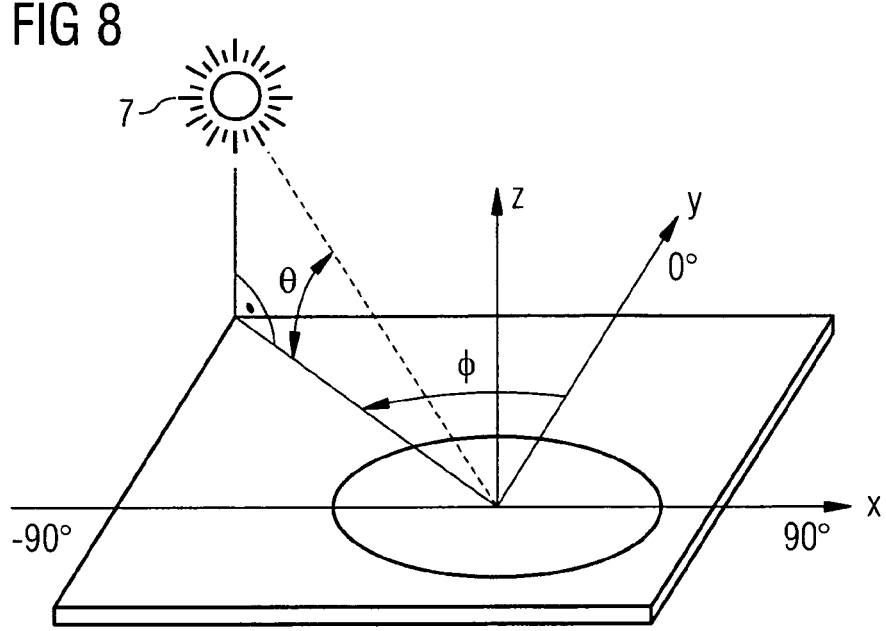
FIG. 8 shows a diagram for elucidating the terms azimuth angle and elevation angle used in this document.

FIG. 8 shows a diagram for elucidating the terms azimuth angle $\phi$ and elevation angle $\theta$ used below. In this case, the y-axis represents the moving direction of an automobile, into which a solar sensor of the described type may be installed. The z-axis is a vertical axis referred to the photodetector surface. The x-axis, in contrast, is an axis that transversely extends through one or more photodetectors of the sensor, namely at a right angle to the y-axis.

The elevation angle $\theta$ is the angle formed by the elevation of the sun 7 relative to the plane defined by axes x and y. It can also be referred to as elevation level or level above the horizon. It reaches its maximum value when the sun is situated vertically above the photodetector of the sensor.

The azimuth angle $\phi$ is defined by the angle formed between the y-axis and the x-axis.

Figure 9:
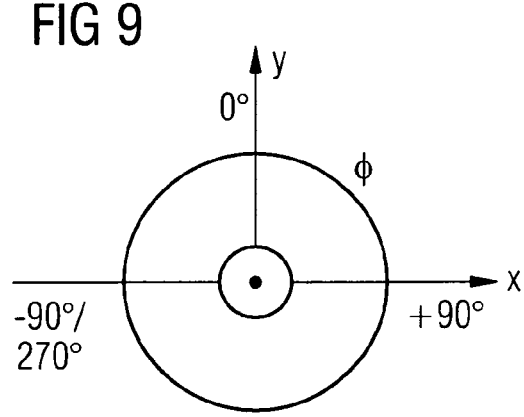
FIG. 9 shows a diagram for further elucidating the term azimuth angle used in this document.

FIG. 9 shows the ranges of the azimuth angle $\phi$. It has a value of 0° or 360° when the sun 7 is situated on a point along the ordinate. The angle has a value of 90 or −90° on a point along the abscissa.

Figure 10:
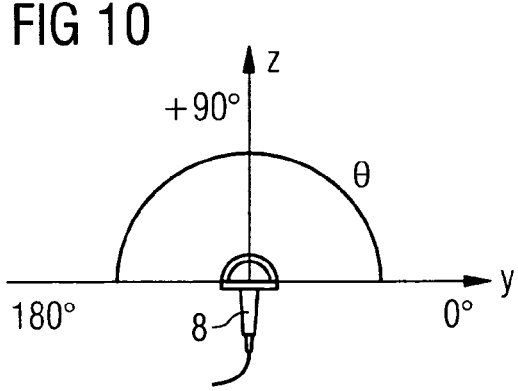
FIG. 10 shows a diagram for further elucidating the term elevation angle used in this document.

FIG. 10 shows the ranges of the elevation angle $\theta$, as well as the position of the solar sensor 8 relative to the z- and y-axes. In this case, the y-axis extends in the driving direction of the vehicle, into which the solar sensor is installed.

FIGS. 11-14 show the output signal voltages $U_s$ of a two-zone solar sensor in dependence on the elevation angle $\theta$ of the sun at four constant azimuth angles $\phi$. The curves drawn with continuous lines and the curves drawn with broken lines respectively show the output signal voltages of the photodetectors of the solar sensor arranged to the right (R) and to the left (L) of a reference axis, wherein the reference axis is defined by the driving direction of a vehicle, into which the solar sensor is installed. The different curve shapes in the figures discussed below are caused by different reactions of the two photodetectors that result from the slightly different angles of incidence of the electromagnetic waves incident onto the photodetectors.

Figure 11:
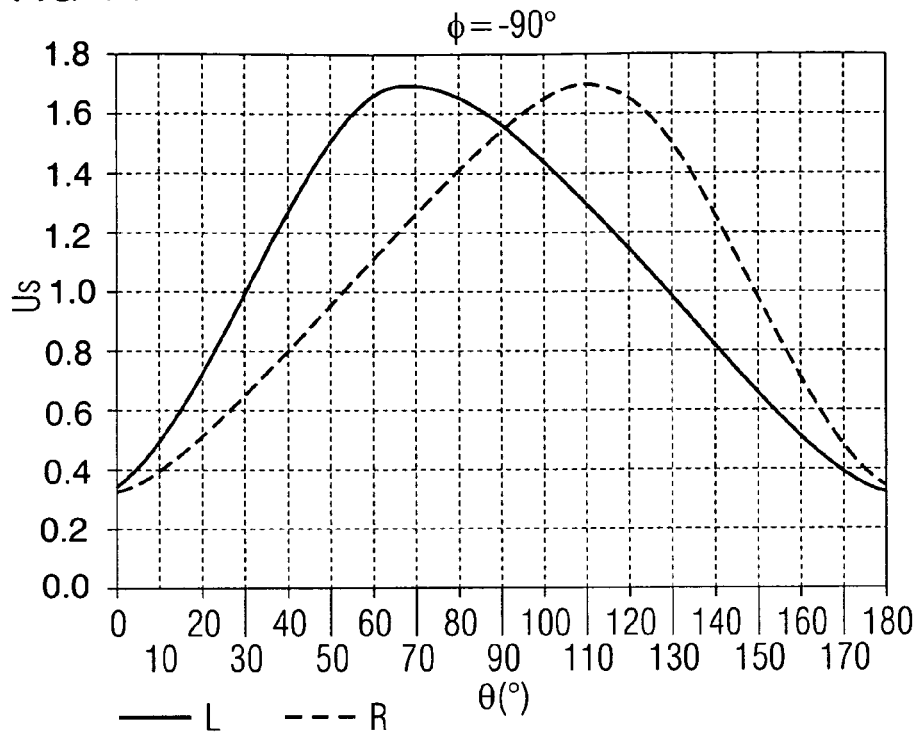
FIG. 11 shows a graph for illustrating the dependence of the output signal voltage of a photodetector on the variable elevation angle at a constant azimuth angle of −90°.

FIG. 11 respectively shows the output signal voltage of the left and the right (broken line) photodetector at a constant azimuth angle $\phi$ of −90' and an elevation angle $\theta$ that varies between 0 and 180°. In this case, the 180'-span of the elevation angle corresponds to the distance traveled by the sun between sunrise at a point on the horizon (elevation 0°, azimuth −90°) and sunset at an opposite point on the horizon (elevation 180°, azimuth 90°). At the beginning of the measurement being carried out, the sun is situated on the horizon on the right side of the sensor, and the sun is situated at the elevation of the horizon on the left side of the sensor at the conclusion of the measurement being carried out. Referred to the elevation angle, the sun therefore travels along the abscissa illustrated in FIG. 10. The output signal voltages generated by both photodetectors lie between 0.3 and 1.7 mV in this case.

Figure 12:
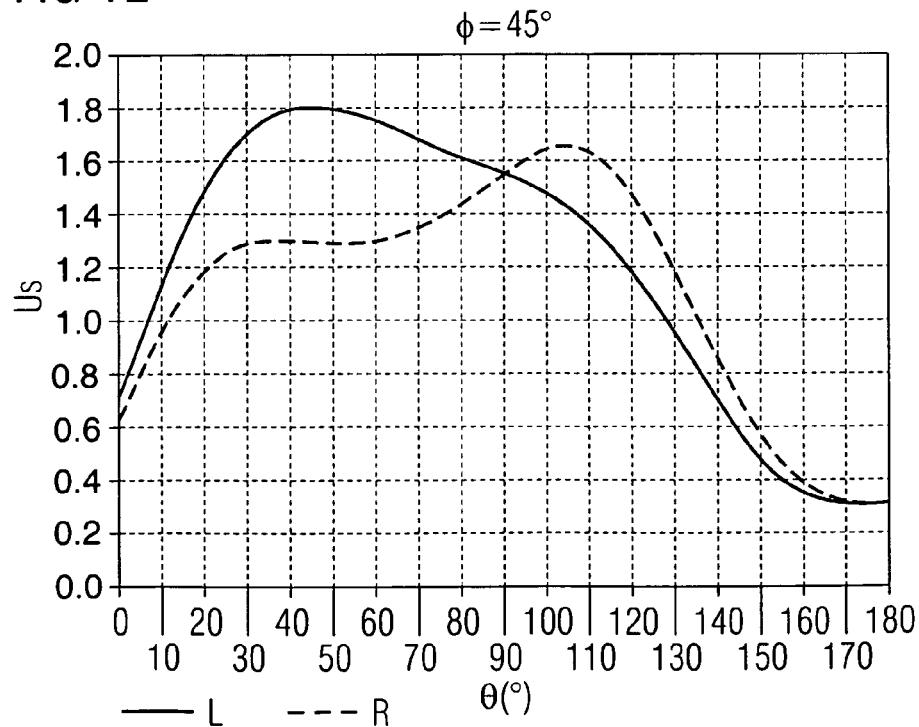
FIG. 12 shows a graph for illustrating the dependence of the output signal voltage of a photodetector on the variable elevation angle at a constant azimuth angle of 45°.

FIG. 12, in contrast, shows the respective output signal voltages of the left and the right photodetector at a constant azimuth angle of ϕ=45°. In this changed orientation of the solar sensor relative to the sun or changed azimuthal position of the sun relative to the solar sensor, the values of the left and the right halves of the sensors lie between 0.3 and 1.8 mV.

Figure 13:
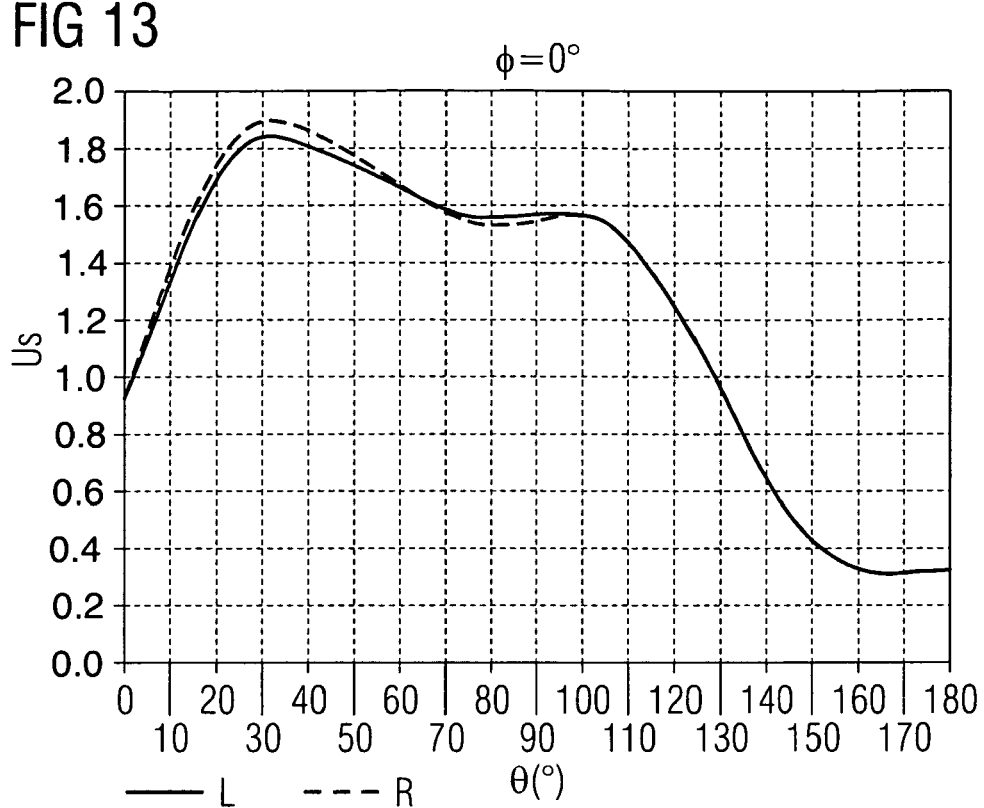
FIG. 13 shows a graph for illustrating the dependence of the output signal voltage of a photodetector on the variable elevation angle at a constant azimuth angle of 0°.

FIG. 13 shows the output signal voltages of the two sensor halves when the sun lies on the line of the reference axis or the ordinate that corresponds to the driving direction of the vehicle, into which the solar sensor is installed, namely at an azimuth angle of 0° referred to the solar sensor. Output signal voltages between 0.3 and 1.9 mV were reached between sunrise and sunset.

Figure 14:
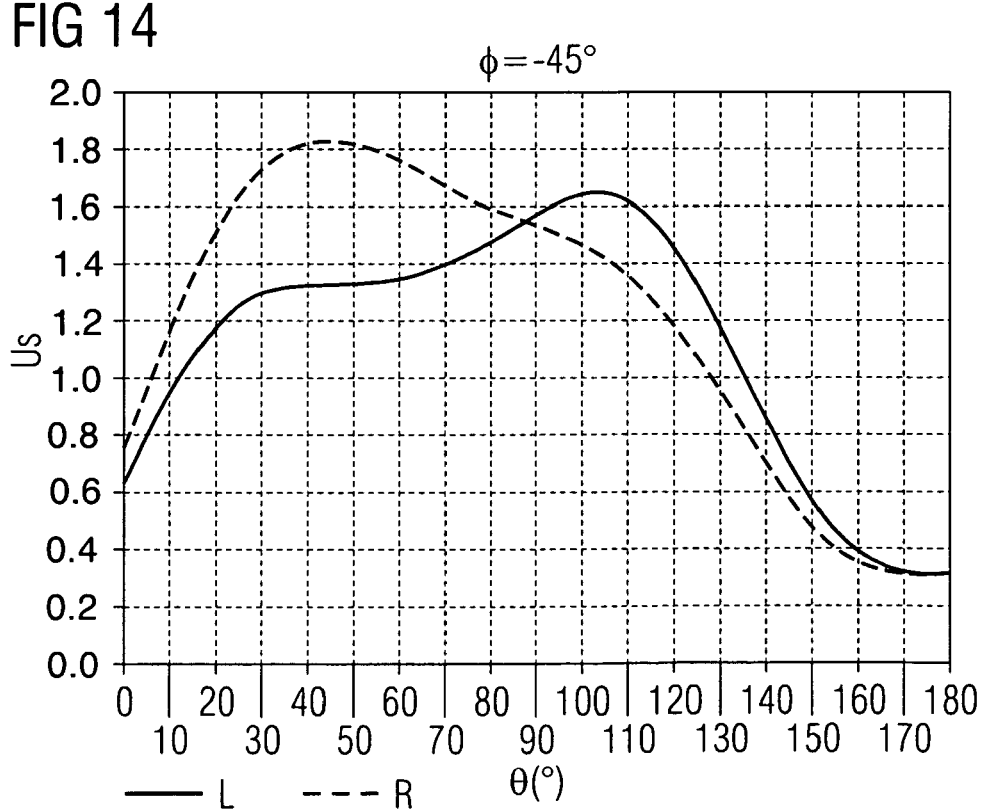
FIG. 14 shows a graph for illustrating the dependence of the output signal voltage of a photodetector on the variable elevation angle at a constant azimuth angle of −45°.

FIG. 14 shows the output signal voltages of the two sensor halves when the sun has an azimuth angle of −45° referred to the solar sensor. Output signal voltages between 0.3 and approximately 1.85 mV were reached. It is obvious that the output signals of the right and the left sensor halves are interchanged in comparison with FIG. 12.

What is claimed is:

1. A solar sensor featuring:
    a first modulator that is transparent to electromagnetic waves within a spectrum;
    an additional modulator that is, at best, slightly transparent to the electromagnetic waves within the spectrum, wherein the additional modulator includes a belt-shaped region arranged on an outside of the first modulator and partially covers the first modulator, wherein the belt-shaped region has a greater width at a top of the first modulator than at sides of the first modulator; and
    a photodetector located to receive the electromagnetic waves and being covered by the first modulator.

2. The solar sensor according to claim 1, wherein the first modulator includes a dome-shaped region and the photodetector is arranged beneath the dome-shaped region relative to irradiation of the electromagnetic waves.

3. The solar sensor according to claim 1, wherein the first modulator includes an angled polish cut.

4. The solar sensor according to claim 3, wherein the angled polish cut of the first modulator is exposed with respect to the second modulator.

5. The solar sensor according to claim 1, wherein the first modulator is realized in one piece.

6. The solar sensor according to claim 1, wherein the additional modulator is realized in one piece.

7. The solar sensor according to claim 2, wherein the first modulator includes several dome-shaped regions that respectively cover the photodetector.

8. The solar sensor according to claim 2, further comprising a flange through which mounting means can be inserted, the flange being arranged adjacent to the dome-shaped region of the first modulator.

9. The solar sensor according to claim 1, wherein the first and additional modulators adjoin one another in a form-fitting fashion.

10. The solar sensor according to claim 1, wherein the first modulator acts as a lens, as well as a prism.

11. The solar sensor according to claim 1, wherein the first modulator contains a translucent material.

12. The solar sensor according to claim 11, wherein the first modulator contains a polycarbonate.

13. The solar sensor according to claim 1, further comprising a covering cap, wherein the first modulator and the additional modulator are covered by the covering cap.

14. The solar sensor according to claim 13, wherein the covering cap has a surface roughness with a scattering effect for electromagnetic waves.

15. The solar sensor according to claim 1, wherein the spectrum, to which the first modulator is transparent, comprises the infrared spectrum.

16. A solar sensor featuring:
    a first modulator that is transparent to electromagnetic waves within a spectrum, wherein the first modulator includes an angled polish cut;
    an additional modulator that is, at best, slightly transparent to the electromagnetic waves within the spectrum, wherein the additional modulator includes a belt-shaped region of varying width arranged on an outside of the first modulator and partially covers the first modulator; and
    a photodetector located to receive the electromagnetic waves and being covered by the first modulator.

17. The solar sensor according to claim 16, wherein the angled polish cut of the first modulator is exposed with respect to the second modulator.

18. The solar sensor according to claim 16, wherein the first modulator includes a dome-shaped region and the photodetector is arranged beneath the dome-shaped region relative to irradiation of the electromagnetic waves.

19. The solar sensor according to claim 18, wherein the first modulator includes several dome-shaped regions that respectively cover the photodetector.

20. The solar sensor according to claim 18, further comprising a flange through which mounting means can be inserted, the flange being arranged adjacent to the dome-shaped region of the first modulator.

* * * * *